May 17, 1932.　　L. D. SOUBIER　　1,859,113
GLASS BLOWING MACHINE
Original Filed May 27, 1922　　8 Sheets-Sheet 1

INVENTOR
Leonard D. Soubier
By J. F. Rule
HIS ATTORNEY

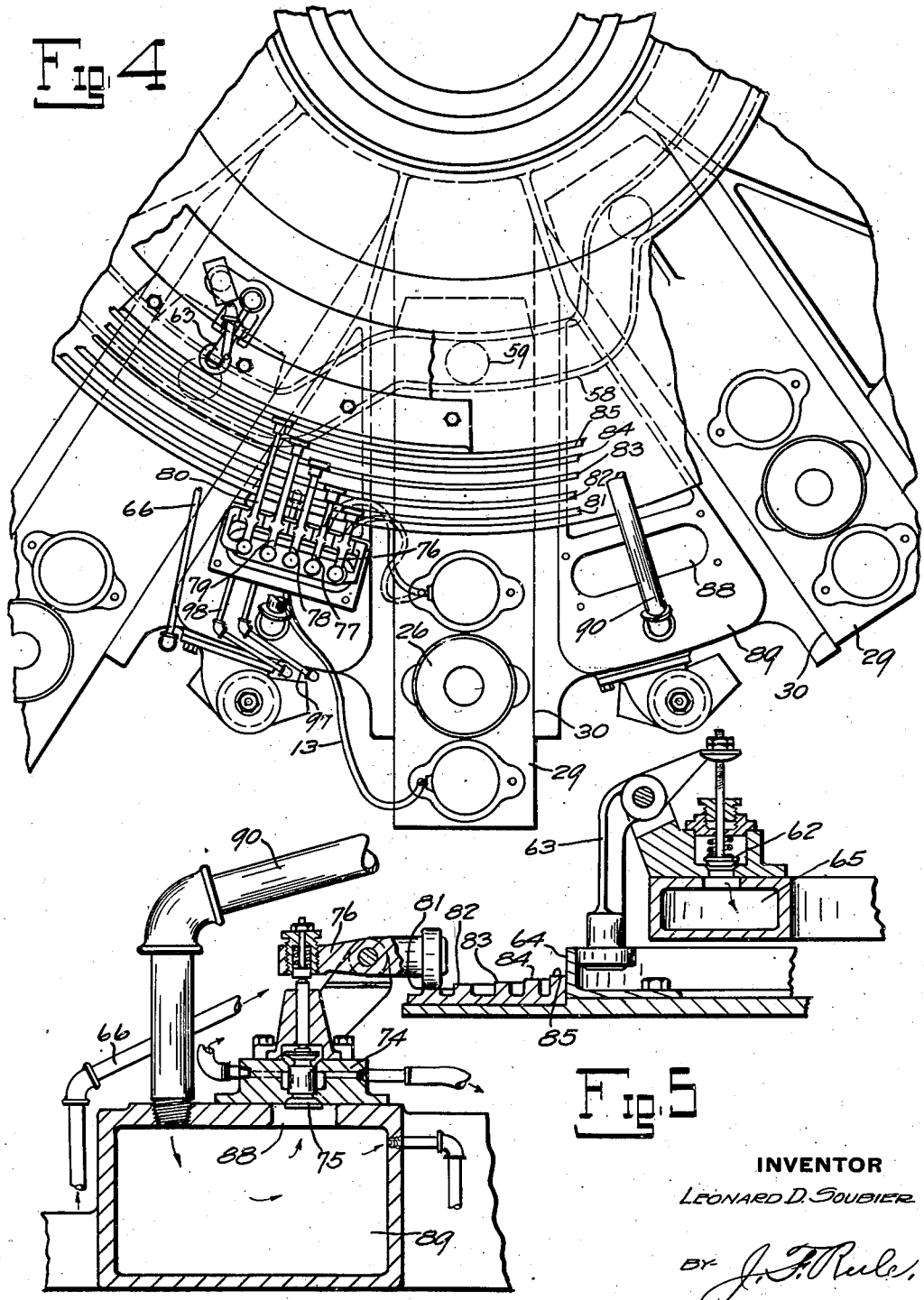

May 17, 1932.  L. D. SOUBIER  1,859,113
GLASS BLOWING MACHINE
Original Filed May 27, 1922   8 Sheets-Sheet 5

INVENTOR
LEONARD D. SOUBIER

BY J.F. Rule
HIS ATTORNEY

May 17, 1932.  L. D. SOUBIER  1,859,113
GLASS BLOWING MACHINE
Original Filed May 27, 1922   8 Sheets-Sheet 6
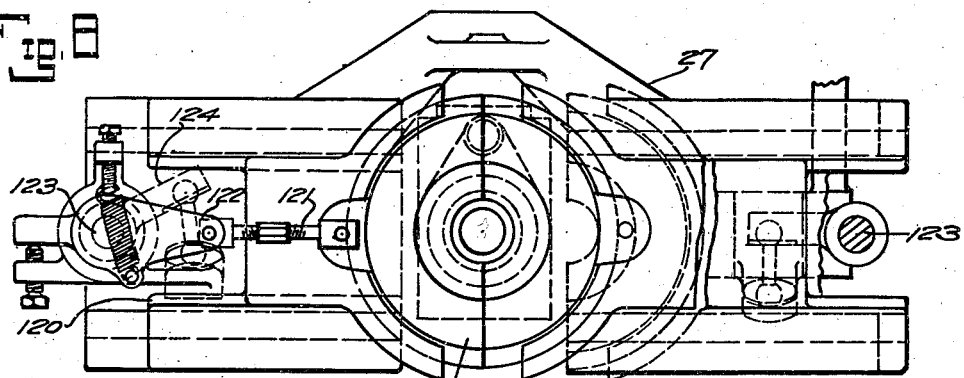
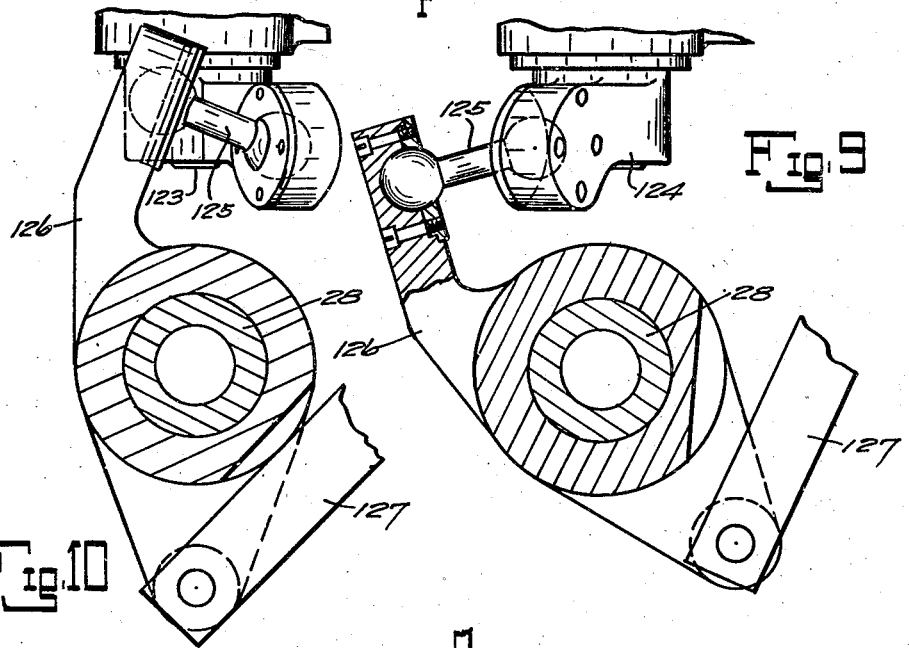
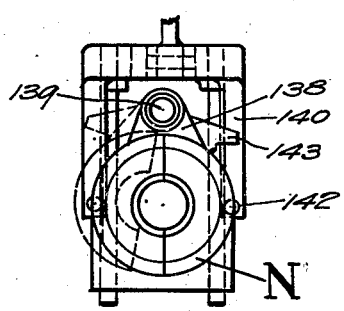
INVENTOR
LEONARD D. SOUBIER
BY J. F. Rule
HIS ATTORNEY

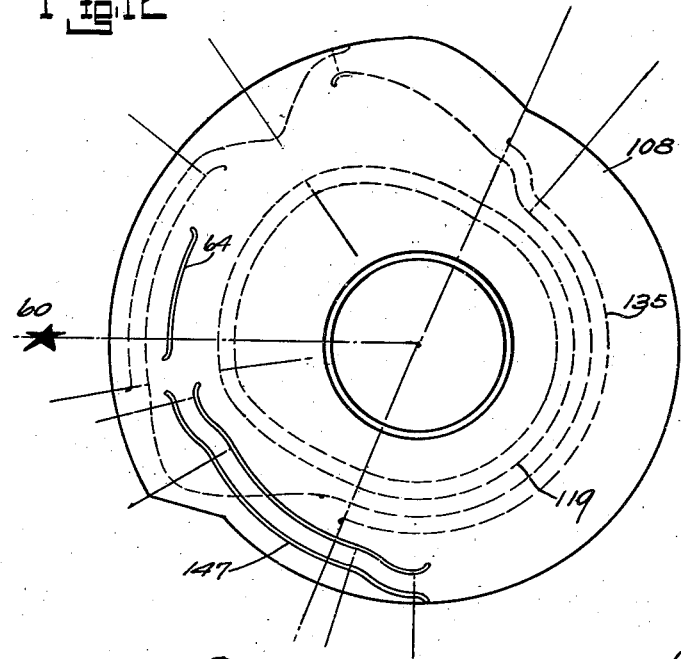
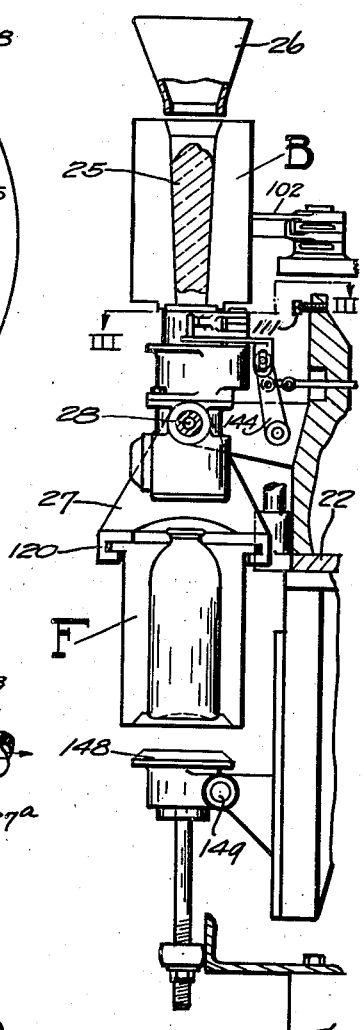
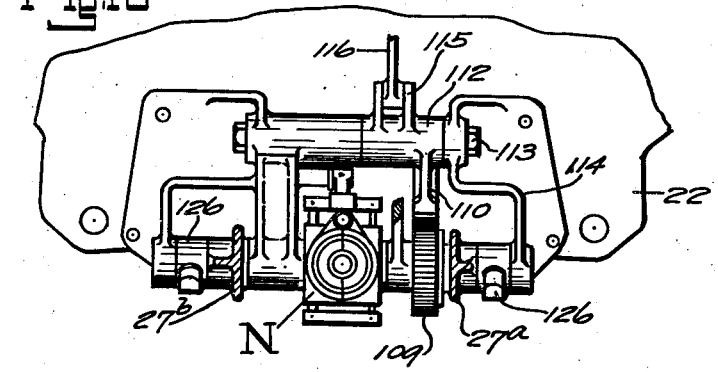

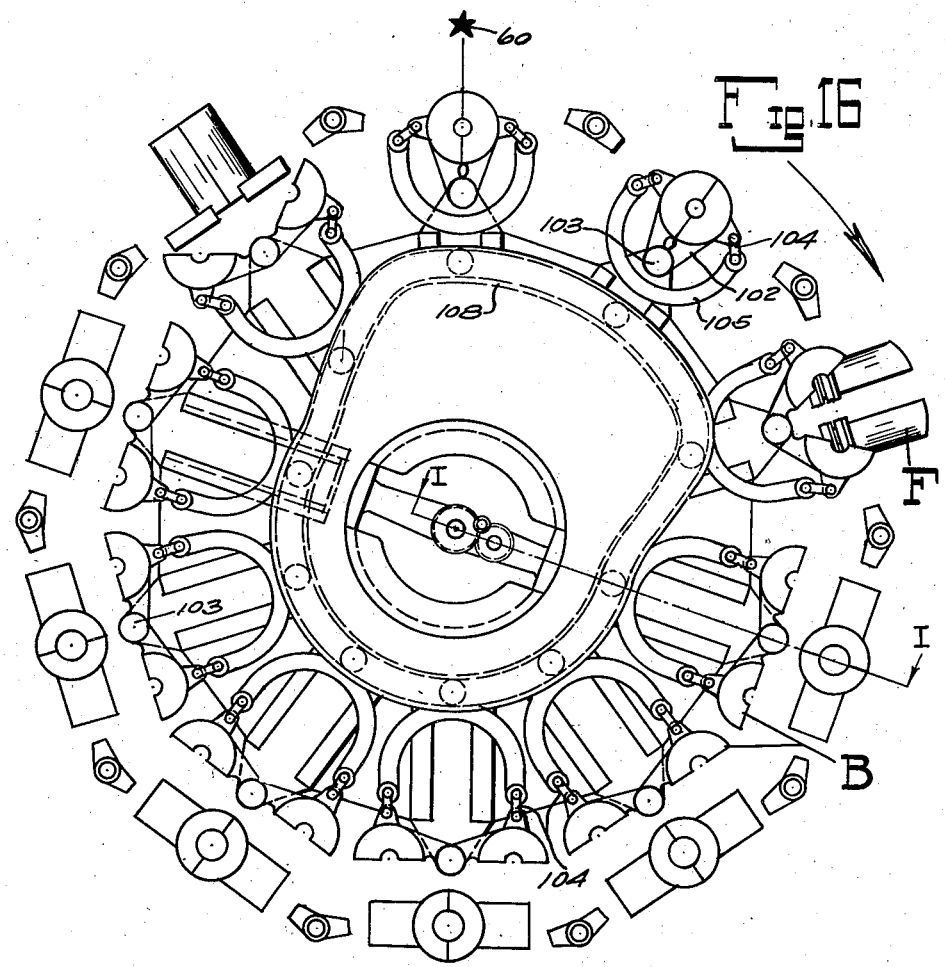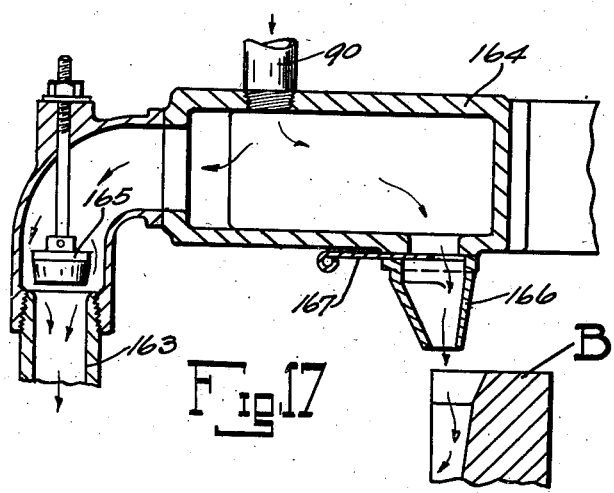

Patented May 17, 1932

1,859,113

UNITED STATES PATENT OFFICE

LEONARD D. SOUBIER, OF WOONSOCKET, RHODE ISLAND, ASSIGNOR TO OWENS-ILLINOIS GLASS COMPANY, OF TOLEDO, OHIO, A CORPORATION OF OHIO

GLASS BLOWING MACHINE

Application filed May 27, 1922, Serial No. 564,183. Renewed October 26, 1931.

My invention relates to machines for blowing bottles or other hollow glass articles. At the present day, bottles and other glass articles of similar shape are usually blown to their finished form in molds arranged with their neck ends uppermost. The charge of glass is ordinarily received in a blank mold in which it is given an initial formation, the neck end of the article being formed in a neck mold. The blank or parison is then transferred to the finishing mold and blown therein by air under pressure supplied through an initial blow opening formed in the upper end of the blank. During this blowing operation, the weight of the plastic glass suspended from the neck mold tends to stretch the glass adjacent the neck mold so that there is a tendency for the upper portion or shoulder of the bottle to blow thin. This results in broken or defective ware.

An object of my invention is to provide a practical machine for blowing bottles which are free from the above defect. To this end I provide a machine in which the charges of glass are received in inverted blank molds, neck molds being arranged in register with the lower ends of the blank molds. After a charge of glass has been given its initial shape in a blank mold, the latter is opened leaving the blank supported in and projecting upward from the neck mold. A finishing mold then closes around the blank and the latter is blown to its finished form in the finishing mold. In this manner the weight of the blank assists in obtaining a proper and uniform distribution of the glass in the finishing mold.

A further feature of the invention relates to the construction of the machine whereby the finished article may be discharged at any desired point within wide limits during the rotation of the machine. In the attainment of this result, the finishing mold with the blown article therein is swung downward about a horizontal axis to turn the article to upright position. In this position it is supported by a mold bottom or support, permitting the finishing mold to be opened and returned. The article is then carried on said support to any desired discharging position and discharged by tilting the support.

Other objects of the invention will appear hereinafter.

In the accompanying drawings:

Figure 4 is a top plan view of a portion of the machine.

Figure 5 is a fragmentary sectional elevation of various parts shown in Figure 4.

Figure 6 is a view illustrating diagrammatically the air connections and valve mechanism controlling various operations, and also illustrating the construction of various air controlled mechanisms.

Figure 7 is a diagrammatic view showing a development of various cams.

Figure 8 is a plan view of the finishing mold and associated parts.

Figure 9 is a detail view on a larger scale showing operating connections for opening and closing the finishing mold.

Figure 10 is a similar view with the parts in a different position.

Figure 11 a detail showing a neck mold and operating means therefor.

Figure 12 is a diagrammatic view of various cams.

Figure 13 is a sectional elevation showing particularly the molds.

Figure 2:
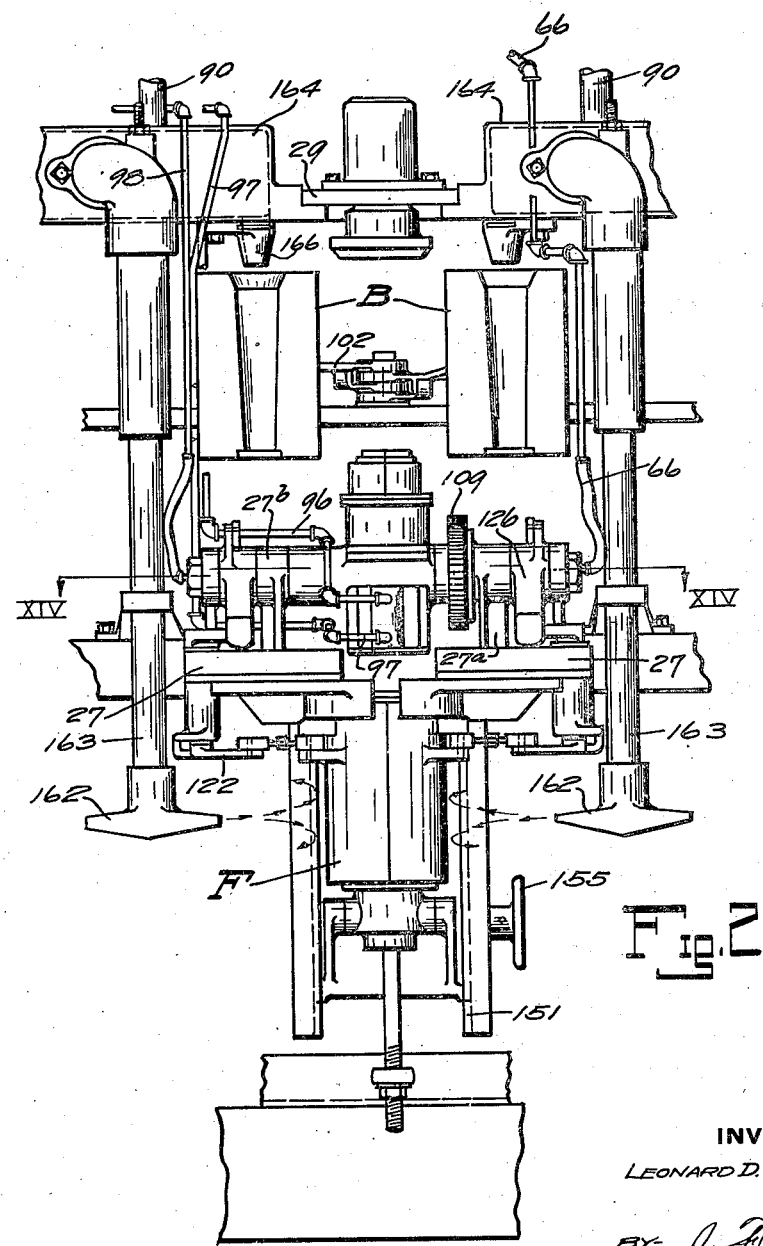
Figure 2 is a front elevation of one of the sections or units of the machine, the finishing mold being in its downward position.

Figure 14 is a fragmentary section at the plane of the line XIV—XIV on Figure 2.

Figure 15 is a fragmentary sectional plan showing the neck mold and means for inverting the finishing mold.

Figure 1:
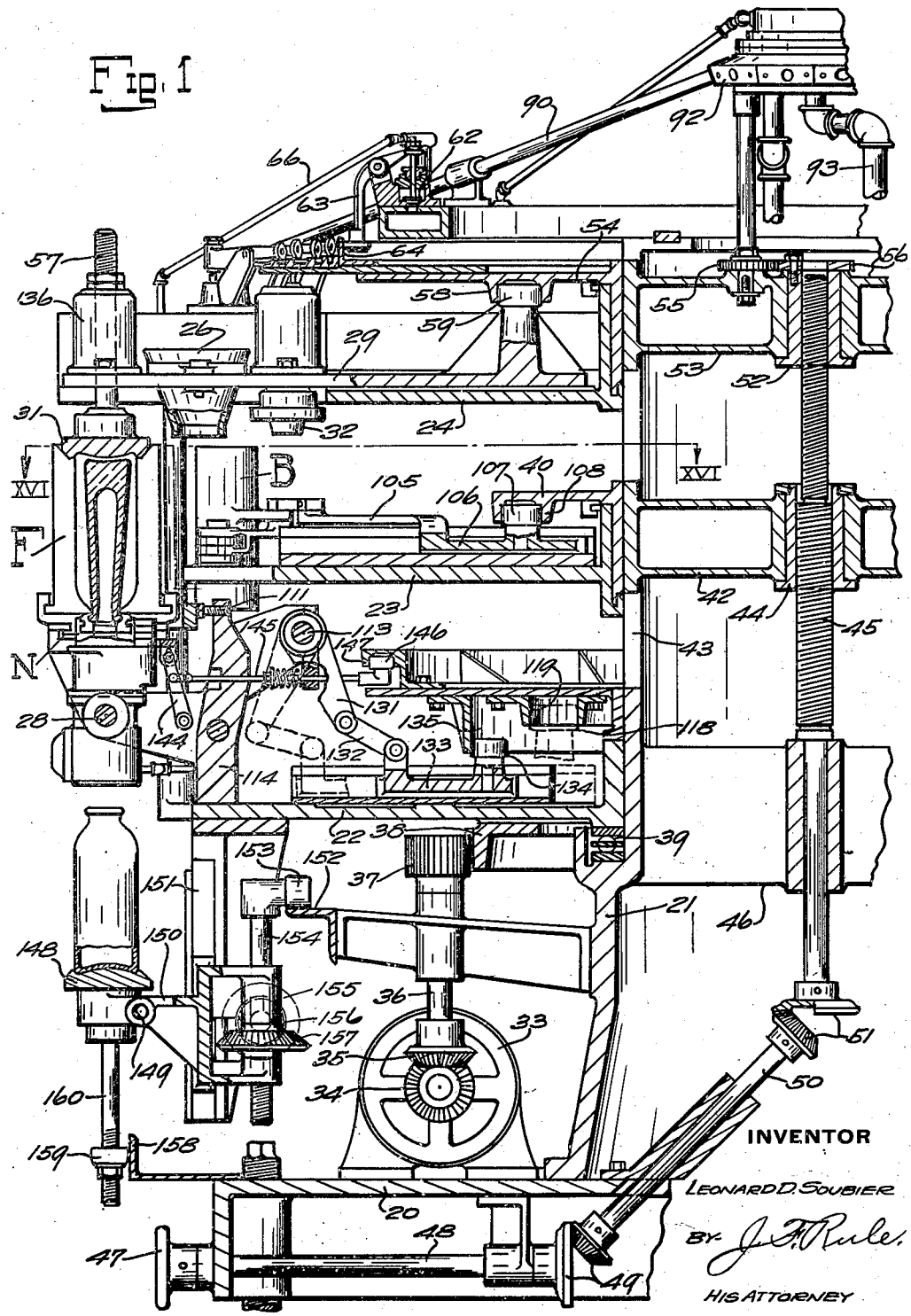
Figure 1 is a sectional elevation of a portion of the machine, the section being at the plane of the line I—I on Figure 16.

Figure 16 is a diagrammatic plan view at the plane of the line XVI—XVI on Figure 1.

Figure 17 is a sectional elevation of an air drum and means for directing and controlling the supply of cooling air to the blank and finishing molds.

The machine comprises a base 20 on which is mounted a stationary center column 21. A mold carriage, mounted to rotate continuously about the center column, comprises a lower section 22, an intermediate section 23 and an upper section 24. Mounted on the carriage are a number of individual heads or units each comprising a group of molds and cooperating mechanisms. Each mold group comprises a blank mold B, a finishing mold F and a neck mold N. The blank molds B are mounted on the intermediate section 23 of the carriage and are movable into and out of the charge receiving position shown in Figure 13, in which position the charge of glass 25 is dropped into the mold through a funnel guide 26 mounted on the upper section 24 of the carriage. The finishing mold F is carried on a turn-over frame 27 mounted on a horizontal shaft 28 by which the finishing mold is swung from the Figure 13 position upward to the Figure 1 position in which it is closed around the blank or parison projecting upward from the neck mold after the blank mold has opened. The means for opening and closing the molds and for inverting the finishing molds will be fully described later.

The funnel guides 26 are carried on supporting plates or carriers 29 mounted to reciprocate radially toward and from the center of the mold carriage in guides 30 formed on the spider 24, there being a carrier 29 associated with each group of molds. Also mounted on the carrier 29 is a mold bottom or closure plate 31 to close the upper end of the inverted finishing mold. A head 32 is supported on the carrier 29 and serves to close the upper end of the blank mold after the latter has received its charge. The head 32 may also serve as a blowing head through which air under pressure is supplied to the blank mold for compacting the glass therein and forming the neck end of the bottle.

The mold carriage is rotated continuously by means of a motor 33 (Fig. 1) operating through gears 34, 35, shaft 36, pinion 37 and an annular gear 38, the latter being fixed to the mold carriage. The carriage is supported on roller bearings 39. The intermediate and upper sections 23 and 24 are vertically adjustable up and down and relatively to each other. The construction permitting such adjustment is as follows:

The intermediate section 23 of the carriage has an interlocking rotatable connection with a non-rotating cam plate 40 connected to a yoke 42 slidable vertically in guideways 43 formed in the center column 21. A non-rotating bearing sleeve 44 in the yoke 42 has a screw threaded connection with a vertical adjusting rod 45 at the center of the machine. This rod has a bearing in a yoke 46 fixed to the column 21. The rod 45 may be rotated by means of a hand wheel 47 having a driving connection with said rod through a shaft 48, gears 49, shaft 50 and gears 51. When the rod 45 is rotated, the yoke 42 is moved up or down, carrying with it the intermediate section 23 of the carriage. The rotation of the adjusting rod 45 also serves to adjust the upper section 24 of the carriage up or down. For this purpose, the rod 45 is threaded in a sleeve 52 mounted in a yoke 53 carrying a stationary cam plate 54 having an interlocking connection with the section 24. When the rod 45 is rotated, the sleeve 52 being held against rotation, the upper section 24 of the mold carriage is moved up or down. The section 24 may be adjusted up and down independently of the section 23 by rotating the sleeve 52 in its bearing while the rod 45 remains stationary. This may be done by rotating a gear 55 meshing with a gear 56 secured to the sleeve 52. The vertical adjustments of the carriage sections permit the use of molds of different lengths. The closure plate 31 is adjustable vertically to fit molds of different lengths, and for this purpose is provided with a screw threaded stem 57.

The position of the slide plate or carrier 29 (Figs. 1 and 4) is controlled by a stationary cam 58 in which runs a roll 59 on the carrier. As the carriage rotates, each blank mold is brought to the charging position indicated by the star 60 (Fig. 16). The blank mold at this time is in closed position with the corresponding funnel guide 26 directly over it (Fig. 13) so that the charge of glass, which may be supplied from an automatic feeder, drops through the funnel into the blank mold. The neck mold which at this time is closed and in register with the lower end of the blank mold, forms the neck end of the bottle or other article. If desired, the air may be exhausted through the neck mold to assist in forming the neck. The suction is controlled by a valve 62 (Figs. 1, 5 and 6) actuated by a cam 64 operating through a lever 63. The valve 62 controls communication between a vacuum chamber 65 and a pipe line 66 which leads (Fig. 2) to the right hand end of the turn-over shaft 28 and through channel 67 (Fig. 14) in said shaft and thence upward through passageway 68 (Fig. 6) along the plunger 69 to the neck mold.

After the charge of glass has been introduced into the neck mold, the carrier 29 is moved radially outward by its cam to bring the blowing head 32 directly over the blank mold. The head 32 is then lowered to close the blank mold by means of an air motor 70 having a piston 71 connected through a rod 72 to the head 32. Air under pressure is admitted above the piston through a pipe 73 leading from a valve plate or chest 74 in which are mounted valves 75 (Fig. 5). These valves are actuated by levers 76, 77, 78, 79 and 80 controlled respectively by stationary cams 81, 82, 83, 84 and 85. The cam 82 operates through lever 77 to open its valve and supply air through pipe 73 for lowering the blowing head 32. The cam 81 then operates the valve lever 76 whereby air is admitted through a pipe 86 to the blowing head 32 and past a check valve 87 in said head, to the mold, whereby the glass is compacted in the blank mold. This air pressure may be used in conjunction with the vacuum for forming the neck as above described. However, it is entirely practical to form the neck of the bottle with either the air pressure or vacuum alone.

The valve box 74 is mounted over an opening 88 in the upper wall of a valve chamber 89, there being one of said valve chambers for each mold group. Air under pressure is supplied to each chamber 89 through a pipe 90 leading to the distributing head 92 to which the air is supplied through a pipe 93 connected to an air compressor.

After the neck of the bottle is formed, as above described, the plunger 69 is withdrawn. The movements of this plunger are controlled by an air motor 94 (Fig. 6) having a piston 95 connected to the plunger. Air pressure is maintained continuously above the piston through a pipe 96 connected directly to the chamber 89. Air pressure is admitted beneath the piston 95 through a pipe 97. The air supply through this pipe is controlled by the valve lever 79 and cam 84. When said valve lever is operated to cut off the air pressure supply beneath the piston 95, said piston is lowered by the air pressure above the piston.

After the plunger 69 is withdrawn, an initial puff of air is admitted to the blow opening formed by the plunger tip, to blow the glass in the blank mold. This blowing operation is controlled by the cam 85 which operates the valve lever 80 to supply air pressure through a pipe line 98 (see Fig. 2) leading to the left hand end of the turn-over shaft 28 (Fig. 14) and through passageways 99, 100 and thence upwardly along the plunger 69 to the mold.

After the blank has thus been blown in the blank mold, the latter is opened, leaving the bare parison supported in and projecting upwardly from the neck mold. The blank mold (see Fig. 16) is made in horizontally separable sections having arms 102 pivoted to swing about a fulcrum 103. Links 104 connect the mold arms with a yoke 105 on a slide 106 (Fig. 1) having a cam roll 107 running in a stationary cam 108 on the cam plate 40.

Figure 3:
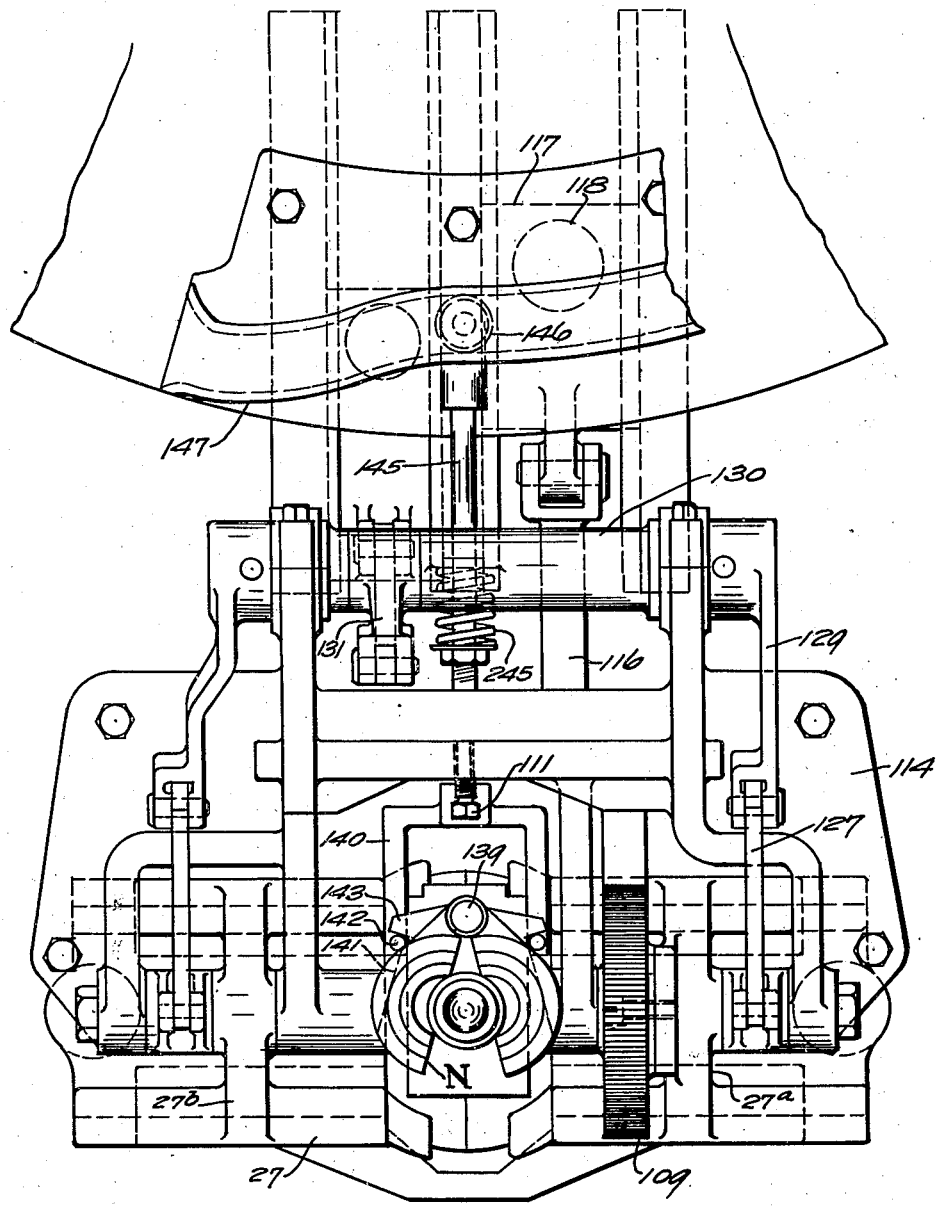
Figure 3 is a plan view as indicated by the line III—III on Figure 13.

When the blank mold opens, the finishing mold swings upward from the Figure 13 position to the inverted position shown in Figure 1 and is closed around the parison. The finishing mold sections are carried on a frame 27 having arms 27ª and 27ᵇ journalled on the shaft 28, so that the frame may rotate on said shaft. Secured to the frame 27 is a gear wheel 109 journalled on the shaft 28 and running in mesh with a gear segment 110 formed on a sleeve 112 having its bearing on a shaft 113 mounted in a frame or bracket 114 in which the shaft 28 is also mounted. The frame 114 is fixed to the lower section 22 of the carriage. A rock arm 115 on the sleeve 112 is connected through a link 116 (Fig. 3) to a slide block 117 mounted to slide radially on the carriage section 22 and carrying a cam roll 118 running on a stationary cam 119 (Fig. 1). It will be seen that through the connections just described, the cam 119 controls the inverting movements of the finishing mold. An adjustable stop 111 on the frame 114 limits the upward swinging movement of the finishing mold.

The finishing mold comprises two sections mounted to slide to and from each other on horizontal guideways 120 (Fig. 8) on the frame 27. The opening and closing movements of the finishing mold are effected through the following mechanism :—Links 121 connect the mold sections to rock arms 122 carried on rock shafts 123 to which are also connected rock arms 124. Links 125 are connected by universal joints to the rock arms 124 and to levers 126 fulcrumed on the shaft 28. Links 127 connect the levers 126 with arms 129 (Fig. 3) on a yoke 130 mounted to rock in the frame 114. An arm 131 on said yoke is connected (Fig. 1) through a link 132 to a slide block 133 carrying a cam roll 134 which runs on a stationary cam 135 by which the opening and closing movements of the finishing mold are effected.

The finishing mold during its upward inverting movement is in open position, as indicated at the upper right hand side of Figure 16, so as to clear the parison. When this upward movement is completed, the mold sections are closed by the mechanism just described. The mold closing plate 31 (Figs. 1 and 6) is then lowered by means of an air motor 136. Air under pressure is supplied to this motor through a pipe 137 leading to the valve actuated by lever 78, controlled by the cam 83. When the plate 31 is moved downward to close the mold bottom, air under pressure is admitted to blow the parison to its finished form. The supply of air for this purpose is controlled by the cam 85 operating through valve lever 80 to admit air to the pipe 98, which, as heretofore described, also supplies air for the initial blowing of the glass in the blank mold.

After the blowing of the glass in the finishing mold, the neck mold is opened. Referring particularly to Figures 1, 3, 11 and 13, the neck mold and its operating means will now be described. The neck mold comprises horizontally separable sections carried by arms 138 which swing about a pivot pin 139. A yoke 140 mounted to slide radially of the mold carriage, carries pins 142 which, as said yoke is moved radially inward, engage lugs 143 on the arms 138 and swing the mold sections to open position. The yoke 140 is connected with a lever 144, which lever is operated by a rod 145 carrying a cam roll 146 running on a cam 147. When the yoke 140 is moved outward, the pins 142 engage flat surfaces 141 on the mold sections and close the mold. A spring 245 on the rod 145 closes the neck mold and holds it closed when not under the control of the cam.

After the bottle has been blown in the finishing mold, the plate 31 withdrawn and the neck mold opened, the finishing mold with the bottle therein is swung downward to the Figure 13 position. A bottom plate or support 148 is then moved upward to engage the bottom of the bottle after which the finishing mold opens, leaving the bottle supported on said bottom plate. The support 148 is connected by a pivot 149 to a bracket 150 for vertical movement in guideways 151 formed in arms depending from the section 22. The vertical movements of the support 148 are controlled by a cam track 152 on which runs a roll 153 on a vertical rod 154 carried in the bracket 150. The support 148 may be adjusted up and down manually by a hand wheel 155 (Figs. 1 and 2) operating through gears 156 and 157, the latter threaded on the rod 154. The finished bottle may be discharged at any desired point during the rotation of the carriage after the finishing mold is opened, by tilting the support 148 about its pivot 149. The support is held up by a cam 158 which engages a roll 159 on a stem 160 depending from the support 148. By changing the position of the cam 158 or substituting another cam of different length, the point at which the bottles are discharged during the rotation of the mold carriage, may readily be varied to meet varying requirements.

Means for cooling the molds (Fig. 2) comprises nozzles 162 through which air is blown against the finishing molds, said nozzles being carried at the lower ends of vertical pipes 163, the upper ends of said pipes having connection with air chambers 164 (Fig. 17). The pipes 163 are preferably made in telescoping sections to permit adjustment of the mold carriage, as heretofore described. At the upper end of the pipe 163 is a regulator or damper 165 adjustable up and down to throttle the air passage to a greater or less extent and thereby govern the supply of air to the blowing nozzles. It will be noted that the pipes 163 are arranged between adjacent finishing molds so that each pipe supplies air for cooling the molds on both sides thereof. Air for cooling the blank molds is supplied from the chambers 164 through spouts 166. The air supply through these spouts is regulated by horizontally adjustable check valves 167.

The operation of the machine may be recapitulated as follows, reference being had particularly to Figure 7 which illustrates diagrammatically the cams controlling the various operations and indicates the order of the operations:

During the continuous rotation of the mold carriage, as each blank mold reaches the charging position 60, a charge of glass is dropped therein. The cam 82 then operates at the point $n$ (Fig. 7) to supply air to the motor 70 and move the blow head 32 (Fig. 6) down to close the blank mold. The cam 81 then operates at $o$ (Fig. 7) to supply air pressure through the blow head 32 and compact the glass in the mold. The cam 84 now operates at $q$ to project the plunger 69 upward. The cam 85 then operates at $p$ to supply an initial puff of air through the neck mold for blowing the blank in the blank mold. At $r$ the cam 82 operates to withdraw the blow head 32. About the time the blow head is withdrawn, the cam 108 operates between the points $s$ and $t$ to open the blank mold. The cam 135 operates, commencing at the point $u$ to open the finishing mold which is in its downward position. The cam 119 then operates between the points $v$ and $w$ to swing the open finishing mold upward to embrace the bare parison which was left supported in and projecting upward from the neck mold when the blank mold opened. When the finishing mold is thus inverted, the cam 135 operates at the point $x$ to close the finishing mold around the parison. The cam 83 then operates at the point $y$ to lower the closure plate 31 onto the finishing mold so that the parison is enclosed ready for final blowing. The cam 85 then operates to effect this final blowing which is continued from the points $a$ to $b$. As this blowing is completed, the cam 83 operates at the point $c$ to withdraw the closure plate 31. The cam 147 also operates at point $d$ to open the neck mold. The finishing mold with the blown bottle or other article therein is then swung down, this movement of the mold being controlled by the cam 119 between the points $e$ and $f$. The cam 108 also operates about this time (between points $g$ and $h$) to close the blank mold. The cam 147 operates at $i$ to close the neck mold. The blank mold is now ready to receive the next charge. If vacuum is used for forming the neck of the bottle, the cam 64 operates at the point $k$ to exhaust the air through the neck mold as the blank moves into charge receiving position. It will be understood that the particular order and timing of the various operations as just described and as indicated diagrammatically in Figure 7, may be varied, particularly as to some of the operations.

Modifications may be resorted to within the spirit and scope of my invention.

What I claim is:

1. In a glass blowing machine, the combination of a blank mold and a neck mold in register, means to introduce a charge of glass into said molds and form the neck of the article, means to open the blank mold leaving the blank supported in and projecting upwardly from the neck mold, a finishing mold, means to close the finishing mold around the upwardly projecting blank, and means to blow the blank in the finishing mold.

2. In a glass blowing machine, the combination of a blank mold and a neck mold in register, means to introduce a charge of glass into said molds and form the neck of the article, means to open the blank mold leaving the blank supported in and projecting upwardly from the neck mold, a finishing mold, means to close the finishing mold in inverted position around the blank, means to blow the article in the inverted finishing mold, and means to turn the finishing mold with the article therein about a horizontal axis and discharge said article from the mold in an upright position.

3. In a glass blowing machine, the combination of a blank mold and a neck mold in register, means to introduce a charge of glass into said molds and form the neck of the article, means to open the blank mold leaving the blank supported in and projecting upwardly from the neck mold, a finishing mold, means to close the finishing mold around the upwardly projecting blank, means to blow the blank in the finishing mold, means to open the neck mold leaving the article supported in an inverted position in the finishing mold, and means to turn the finishing mold over and open it to release said article.

4. In a glass forming machine, the combination of a rotary mold carriage, blank molds thereon open at their upper ends to receive charges of glass, means to open and close the blank molds, finishing molds, means to close the finishing molds around the blanks without changing the positions of the blanks relative to the carriage after they are formed in the blank molds, means to blow the blanks in the finishing molds, and means to invert the finishing molds with the blown articles therein independently of the blank molds.

5. In a glass forming machine, the combination of an inverted finishing mold, means to introduce a formed blank of glass into the mold while the latter is in inverted position, means to blow the blank to its finished form in the inverted mold, and means to then turn the mold to upright position.

6. In a glass forming machine, the combination of a blank mold open at its upper end to receive a charge of glass, a finishing mold, means to open the blank mold, means to close the finishing mold around the blank while the finishing mold is in an inverted position, means to blow the blank, and means to turn the finishing mold to an upright position.

7. In a glass forming machine, the combination of a blank mold open at its upper end to receive a charge of glass, a finishing mold, means to open the blank mold, means to close the finishing mold around the blank while the finishing mold is in an inverted position, means to blow the blank, means to swing the finishing mold downward about a horizontal axis, and means to open the finishing mold and discharge the blown article.

8. In a glass forming machine, the combination of a mold carriage, a blank mold thereon open at its upper end to receive a charge of glass, a neck mold beneath and in register with the blank mold, means to open the blank mold leaving a blank supported in and projecting upwardly from the neck mold, a finishing mold, means to close the finishing mold around the blank while the latter is in said projected position, and means to blow the blank in the finishing mold.

9. In a glass forming machine, the combination of a mold carriage, a blank mold thereon open at its upper end to receive a charge of glass, a neck mold beneath and in register with the blank mold, means to open the blank mold leaving a blank supported in and projecting upwardly from the neck mold, a finishing mold, means to close the finishing mold around the blank while the latter is in said projected position, means to blow the blank in the finishing mold, means to open the neck mold leaving the article supported in the finishing mold, and means to then swing the finishing mold downward about a horizontal axis to a discharging position.

10. In a glass forming machine, the combination of a mold carriage, a blank mold thereon open at its upper end to receive a charge of glass, a neck mold beneath and in register with the blank mold, means to open the blank mold leaving a blank supported in and projecting upwardly from the neck mold, a finishing mold, means to close the finishing mold around the blank while the latter is in said projected position, a closure plate to close the upper end of the finishing mold, means to blow the glass in the finishing mold, means to withdraw said closure plate, means to open the neck mold, means to swing the finishing mold downward, means to open it, and a bottom support on which the article is supported when the finishing mold opens.

11. In a glass forming machine, the combination of an inverted finishing mold, a closure plate for the upper end thereof, means to blow an article to its finished hollow form in the mold, means to withdraw said plate from the finished article, means to then turn the mold to upright position with the article therein, and means to open the mold to discharge the article.

12. In a glass forming machine, the combination of an inverted finishing mold, a closure plate for the upper end thereof, means to blow an article to its finished hollow form in the mold, means to withdraw said plate from the finished article, means to then turn the mold to upright position with the article therein, a bottom support, and means to open the mold and leave the blown article on said support.

13. In a glass forming machine, the combination of an inverted finishing mold, a closure plate for the upper end thereof, means to blow an article to hollow form in the mold, means to withdraw said plate, means to turn the mold to upright position with the article therein, a bottom support, means to open the mold and leave the blown article on said support, and automatic means to tilt said support and discharge the article.

14. The method of forming a hollow glass article which consists in introducing a charge of plastic glass into a blank mold, forming an initial blow opening in the end of the blank, transferring the blank to an inverted finishing mold with the said blow opening down, applying air under pressure in said opening and thereby expanding the glass in the finishing mold, inverting the mold with the blown article therein and discharging the article.

15. In a glass forming machine, the combination of a mold, means to introduce a blank of glass therein, said mold open at its upper end, a closure plate for the upper end of the mold, means to blow the blank to its finished hollow form in the mold, means to withdraw said plate, means to turn the mold over after said plate is withdrawn, and means to then discharge the blown article in said form from the machine.

16. In a glass forming machine, the combination of a mold in which the glass is blown to its finished form by air supplied through the lower end of the mold, a closure plate by which the upper end of the mold is closed during the blowing of the glass, means to withdraw said closure plate after the glass is blown to its finished form, means to then invert the mold by swinging it downwardly about a horizontal axis, and means to open the mold and discharge the blown article.

17. In a glass forming machine, the combination of a mold in which the glass is blown to its finished form, a closure plate by which the upper end of the mold is closed during said blowing of the glass, means to withdraw said closure plate after the glass has been blown to finished form, means to then swing the mold downwardly about a horizontal axis, a bottom support beneath the downwardly swung mold, and means to open the mold and leave the blown article supported on said support.

18. In a glass forming machine, the combination of a mold, means to swing it about a horizontal axis from a position in which the mold projects upward above the axis to a position in which it projects downward below the axis, said mold being open at its outer end, a closure plate to close said end of the mold when in its upward position, means for blowing a charge of glass to the form of a hollow article in the mold when closed by said plate, said article filling the mold and having its end shaped by said plate, and a separate closure plate to close said end of the mold when the mold is in said downwardly projecting position.

19. In a glass forming machine, the combination of a mold, a carrier for the mold, means to swing said carrier about a horizontal axis and thereby swing the mold from a vertical position in which it projects upward above said axis, to a vertical position in which it projects downward from the axis, said mold being open at its upper end, a closure plate to close said end of the mold when in its upward position, means for blowing a charge of glass to the form of a hollow article in the mold when closed by said plate, said article filling the mold and having its end shaped by said plate, and a separate closure plate to close said end of the mold when the mold is in said downwardly projecting position.

20. In a glass forming machine, the combination of a mold, a carrier for the mold, means to swing said carrier about a horizontal axis and thereby swing the mold from a vertical position in which it projects upward above said axis, to a vertical position in which it projects downward from the axis, said mold being open at its outer end, upper and lower closure plates, automatic means to move the upper closure plate to mold closing position, means to blow a charge of glass to finished form in the mold, while the mold is in said upwardly projecting position and closed by the upper closure plate, automatic means to move the lower closure plate to mold closing position when the mold is swung downward with the blown article therein, and means to open the mold and leave the article supported on said lower closure plate.

21. In a glass forming machine, the combination of a rotary mold carriage, a blank mold and a finishing mold thereon open at their upper ends, mold closure devices, a carrier for said devices mounted on the carriage, and means controlled by the rotation of the carriage to move said carrier radially of the mold carriage to bring said closure devices respectively into cooperative relation to said molds.

22. In a glass forming machine, the combination of a rotary mold carriage, a blank mold and a finishing mold thereon open at their upper ends, mold closure devices, a carrier for said devices mounted on the carriage, means controlled by the rotation of the carriage to move said carrier radially of the mold carriage to bring said closure devices respectively into positions over the molds, and automatic means to lower said devices into mold closing positions.

23. In a glass forming machine, the combination of a rotary mold carriage, a blank mold, a finishing mold, mold closing heads, a carrier on which said heads are mounted, and automatic means to move said carrier radially of the axis of the carriage and thereby bring said heads over the blank mold and finishing mold respectively.

24. In a glass forming machine, the combination of a rotary mold carriage, a blank mold, a finishing mold, mold closing heads, a carrier on which said heads are mounted, automatic means to move said carrier radially of the axis of the carriage and thereby bring said heads over the blank mold and finishing mold respectively, and a funnel guide on said carrier and movable thereby into position to direct a charge of glass into the blank mold.

25. In a glass forming machine, the combination of a rotary mold carriage, a sectional blank mold thereon, a neck mold in register with the blank mold, means to open the blank mold and leave a blank supported in the neck mold, a sectional finishing mold, and automatic means to move the finishing mold sections in a straight line bodily to and from each other in a direction perpendicular to the radius of the mold carriage, said sections being positioned when brought together to enclose the blank supported in the neck mold.

26. In a glass forming machine, the combination of a blank mold, a neck mold, means to open the blank mold and leave a blank supported in the neck mold, a finishing mold, means to close the finishing mold around the blank, means to release the neck mold from the blank, and means to invert the finishing mold independently of the neck mold.

27. In a glass forming machine, the combination of a blank mold, a neck mold, means to open the blank mold and leave a blank supported in the neck mold, a finishing mold, means to close the finishing mold around the blank, means to release the neck mold from the blank, means to blow the blank in the finishing mold, and means to invert the finishing mold independently of the neck mold with the blown article therein.

Signed at Toledo, in the county of Lucas and State of Ohio, this 25th day of May, 1922.

LEONARD D. SOUBIER.